US012683974B2

(12) United States Patent
Shah et al.

(10) Patent No.: US 12,683,974 B2
(45) Date of Patent: Jul. 14, 2026

(54) VARYING INTERNAL AND EXTERNAL HIERARCHIES WITH WEBPAGE ACCESS PERMISSION MANAGEMENT

(71) Applicant: Notion Labs, Inc., San Francisco, CA (US)

(72) Inventors: Natasha Mayur Shah, San Francisco, CA (US); Christopher Papazian, San Francisco, CA (US); Matthew Piccolella, San Francisco, CA (US); Ein Jung, Brooklyn, NY (US); Omar Skalli, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 66 days.

(21) Appl. No.: 18/961,253

(22) Filed: Nov. 26, 2024

(65) Prior Publication Data

US 2026/0149718 A1 May 28, 2026

(51) Int. Cl.
*H04L 9/40* (2022.01)
*G06F 40/137* (2020.01)
*G06F 40/186* (2020.01)
*G06F 40/197* (2020.01)

(52) U.S. Cl.
CPC .......... *H04L 63/104* (2013.01); *G06F 40/137* (2020.01); *G06F 40/186* (2020.01); *G06F 40/197* (2020.01)

(58) Field of Classification Search
CPC ... H04L 63/104; G06F 40/137; G06F 40/186; G06F 40/197
See application file for complete search history.

(56) References Cited

U.S. PATENT DOCUMENTS

| | | | |
|---|---|---|---|
| 7,028,261 B2 | 4/2006 | Smyth et al. | |
| 9,535,997 B2 * | 1/2017 | Kini ................... | G06Q 30/0613 |
| 2002/0055868 A1 | 5/2002 | Dusevic et al. | |
| 2005/0015442 A1 * | 1/2005 | O'Laughlen .......... | G06F 21/604 |
| | | | 707/E17.112 |
| 2005/0028089 A1 * | 2/2005 | Aoki ..................... | G06F 16/957 |
| | | | 707/E17.119 |
| 2008/0228761 A1 | 9/2008 | Kei et al. | |
| 2010/0017729 A1 * | 1/2010 | Yang ..................... | G06F 16/957 |
| | | | 715/760 |
| 2021/0295822 A1 | 9/2021 | Tomkins et al. | |
| 2024/0221168 A1 | 7/2024 | Wells et al. | |
| 2025/0238594 A1 | 7/2025 | Scales et al. | |

* cited by examiner

*Primary Examiner* — Amie C. Lin
(74) *Attorney, Agent, or Firm* — Perkins Coie LLP; Alberto Araiza; Lena Petrovic

(57) ABSTRACT

A system can generate a website where pages are internally structured in a certain hierarchy, but where the pages can be published to an external hierarchy that need not match this internal hierarchy. These differing hierarchies allow for pages to be organized in the optimal way for both internal and external users. Each page can be assigned its own access permissions, designating it as public or private independently of the other pages and of its place in the internal hierarchy. Pages can also be published to a different domain than others in the external hierarchy and may be published to the external hierarchy with a different set of parent-child relationships than the page has in the internal hierarchy.

20 Claims, 12 Drawing Sheets

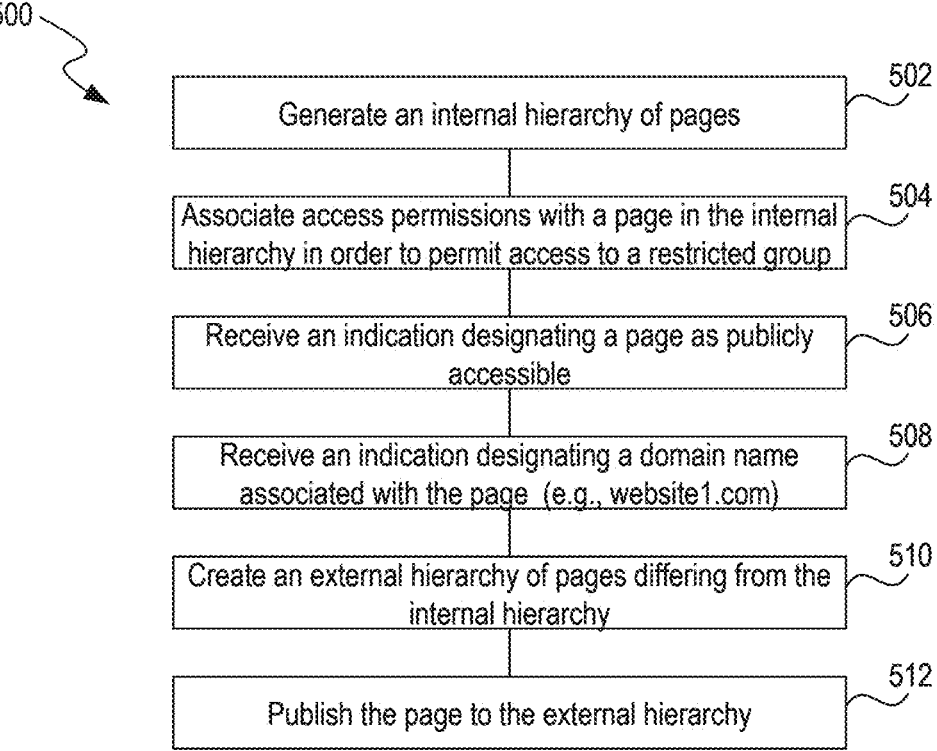

500

502 Generate an internal hierarchy of pages

504 Associate access permissions with a page in the internal hierarchy in order to permit access to a restricted group 506 Receive an indication designating a page as publicly accessible 508 Receive an indication designating a domain name associated with the page (e.g., website1.com)

510 Create an external hierarchy of pages differing from the internal hierarchy

512 Publish the page to the external hierarchy

Sites                                                    ⓘ Learn more

Domains
Pages published to the web will be live on one of these domains

| Domain | Homepage | Status | |
|---|---|---|---|
| mattpic.notion.site  ⚑   ⊕ | 🖼 MattPic's Book Notes | ● Live | ⋯ |
| mattpic-templates.notion.site | 🔍 Select a page | ● Live | ⋯ |
| www.mattpic.com | 👤 Matt Piccolella | ● Live | ⋯ |

New domain

All published sites ⓘ

| Page | Domain | Published by | Status | Published Date | |
|---|---|---|---|---|---|
| 👤 Matt Piccolella | www.mattpic.com/... | Matt Piccolella | | Jun 11, 2024 | ⋯ |
| 🖼 Andreessen Horowitz | www.mattpic.com/... | Matt Piccolella | | Jun 6, 2024 | ⋯ |
| 🎂 Emma's 30th Birthday | mattpic.notion.site/... | Matt Piccolella | | May 15, 2024 | ⋯ |
| 👤 Autolist AI | mattpic.notion.site/... | Matt Piccolella | | Apr 8, 2024 | ⋯ |
| 📧 Fake Website | mattpic.notion.site/... | Matt Piccolella | | Mar 6, 2024 | ⋯ |
| 🏓 Annual Review Template | mattpic.notion.site/... | Matt Piccolella | | Dec 27, 2023 | ⋯ |
| 📷 Albums | mattpic.notion.site/... | Matt Piccolella | | Sep 14, 2023 | ⋯ |

Notion

The all-in-one workspace.
Notes, tasks, wikis, & databases.

The all-in-one workspace for your notes, tasks, wikis, and databases.

withtandem.notion.site

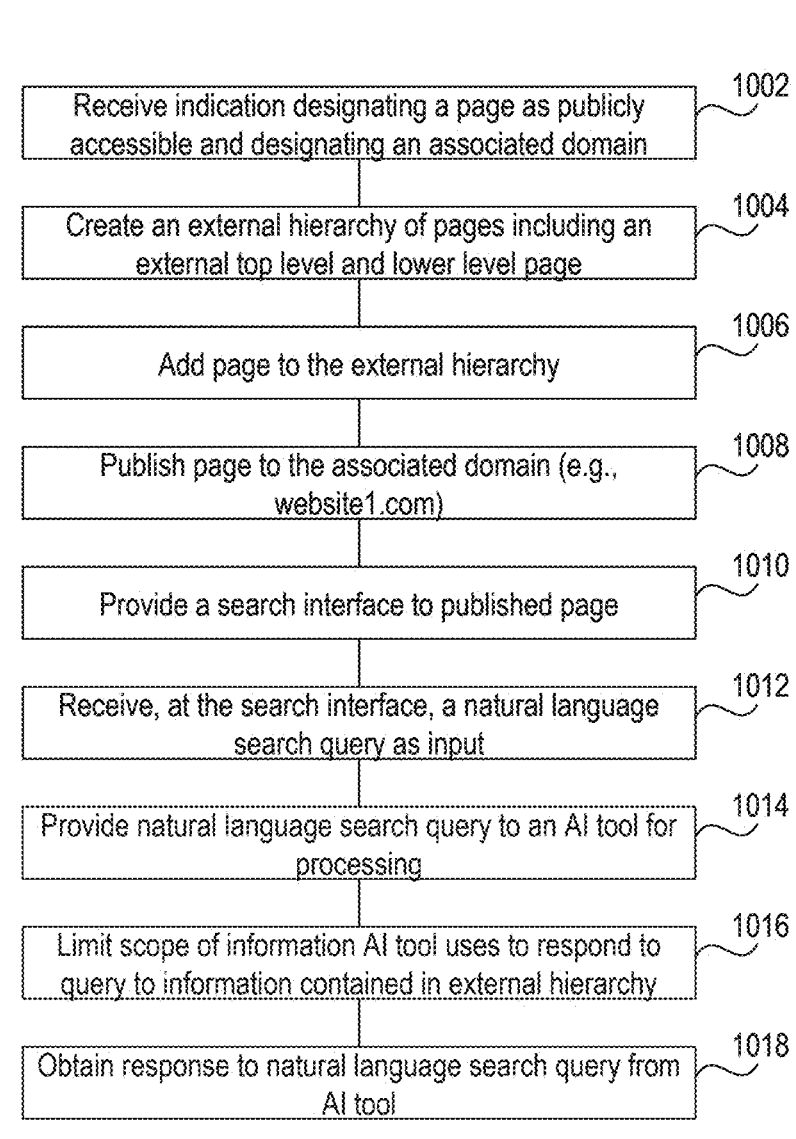

1000

Receive indication designating a page as publicly accessible and designating an associated domain ~1002

Create an external hierarchy of pages including an external top level and lower level page ~1004

Add page to the external hierarchy ~1006

Publish page to the associated domain (e.g., website1.com) ~1008

Provide a search interface to published page ~1010

Receive, at the search interface, a natural language search query as input ~1012

Provide natural language search query to an AI tool for processing ~1014

Limit scope of information AI tool uses to respond to query to information contained in external hierarchy ~1016

Obtain response to natural language search query from AI tool ~1018

*FIG. 10*

VARYING INTERNAL AND EXTERNAL HIERARCHIES WITH WEBPAGE ACCESS PERMISSION MANAGEMENT

BACKGROUND

Domain names, often referred to simply as domains, provide easily recognizable and memorizable names to numerically addressed Internet pages. Domains allow any page to be moved to a different physical location in the address topology of the global network, or locally in an intranet. Websites are collections of one or more pages identified by a common domain and published on at least one web server. Many websites are publicly accessible; these websites collectively constitute the World Wide Web. There are also private websites that can only be accessed on a private network, such as a company's internal website for its employees.

Websites are often built with a hierarchical structure of related pages arranged in a parent-child relationship, with a parent page sitting at the top of the hierarchy and one or more levels of pages sitting below the parent page. The lower levels of the hierarchy are accessible from the parent page. This hierarchical organization facilitates easier navigation and management of content.

BRIEF DESCRIPTION OF THE DRAWINGS

Reference will now be made, by way of example, to the accompanying drawings which show example embodiments of the present application, and in which:

FIG. 5 is a flow diagram illustrating an example method of publishing a page from an internal hierarchy to a differing external hierarchy.

FIG. 7 illustrates an example management portal for displaying and modifying the settings of pages managed by a user.

FIG. 10 is a flow diagram illustrating an example method of searching for information contained on pages in an external hierarchy using an AI tool.

Figure 1:
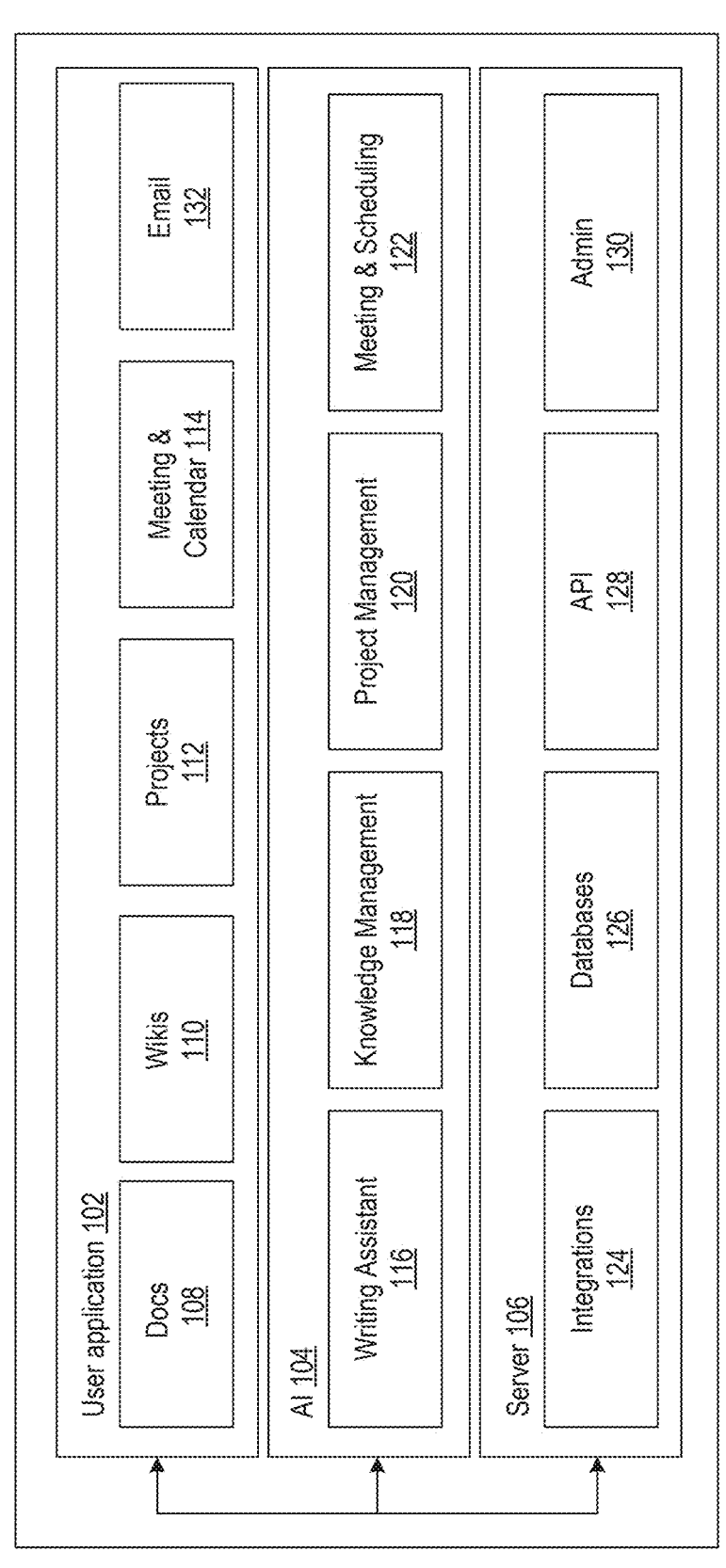
FIG. 1 is a block diagram illustrating a platform that may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for the creation of an internal hierarchy of pages and an external hierarchy of pages that differs from the internal hierarchy but includes one or more pages from the internal hierarchy. The internal hierarchy is not published to the World Wide Web; rather, it is privately accessible, and pages within the internal hierarchy have associated access permissions allowing access to be further restricted only to a certain group of users. The external hierarchy is publicly accessible via the World Wide Web and is created when a page from the internal hierarchy is indicated as being publicly accessible at a certain domain.

Traditionally, development of a website with a hierarchical structure involves creating an internal hierarchy of pages that have a parent-child relationship between one another. One page sits at the top of the hierarchy and is the parent page; this page may then have one or more child pages, sometimes called subpages, sitting at a lower level of the hierarchy. The same internal hierarchy is then published to the World Wide Web to make it publicly accessible. This process has at least two limitations. First, it does not allow website developers to maintain a different internal and external hierarchy, even if the developer believes it would be optimal for public users to experience a different page hierarchy than internal users and/or developers. Second, it does not allow pages included in an internal hierarchy to be made public or private separately from one another; the entire hierarchy must be publicly published or made private as a unit.

The systems and methods disclosed herein overcome both limitations by allowing for one or more pages in an internal hierarchy to be published to a publicly accessible external hierarchy without requiring that external hierarchy to be the same as the internal hierarchy. In some implementations, pages from the internal hierarchy having a certain parent-child relationship to one another are published to the external hierarchy with a different parent-child relationship and/or are published to different domains, with a child page published to one domain being accessible from a parent page published to another domain via a hyperlink. These differing hierarchies allow for pages to be organized in the most logical and convenient way for both internal and external users, even if those organizations differ from one another. In other implementations, certain pages from the internal hierarchy can be left private while others are published, allowing pages that are not prepared or intended for public access to stay private without having to dissociate them from other pages within the internal hierarchy that are intended to be made publicly accessible.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type that defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client device ("client"). Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers, so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction.

For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from Message-Store using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the UI to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React. Software Platform FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100 or an embedding of a block in the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Autoregressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
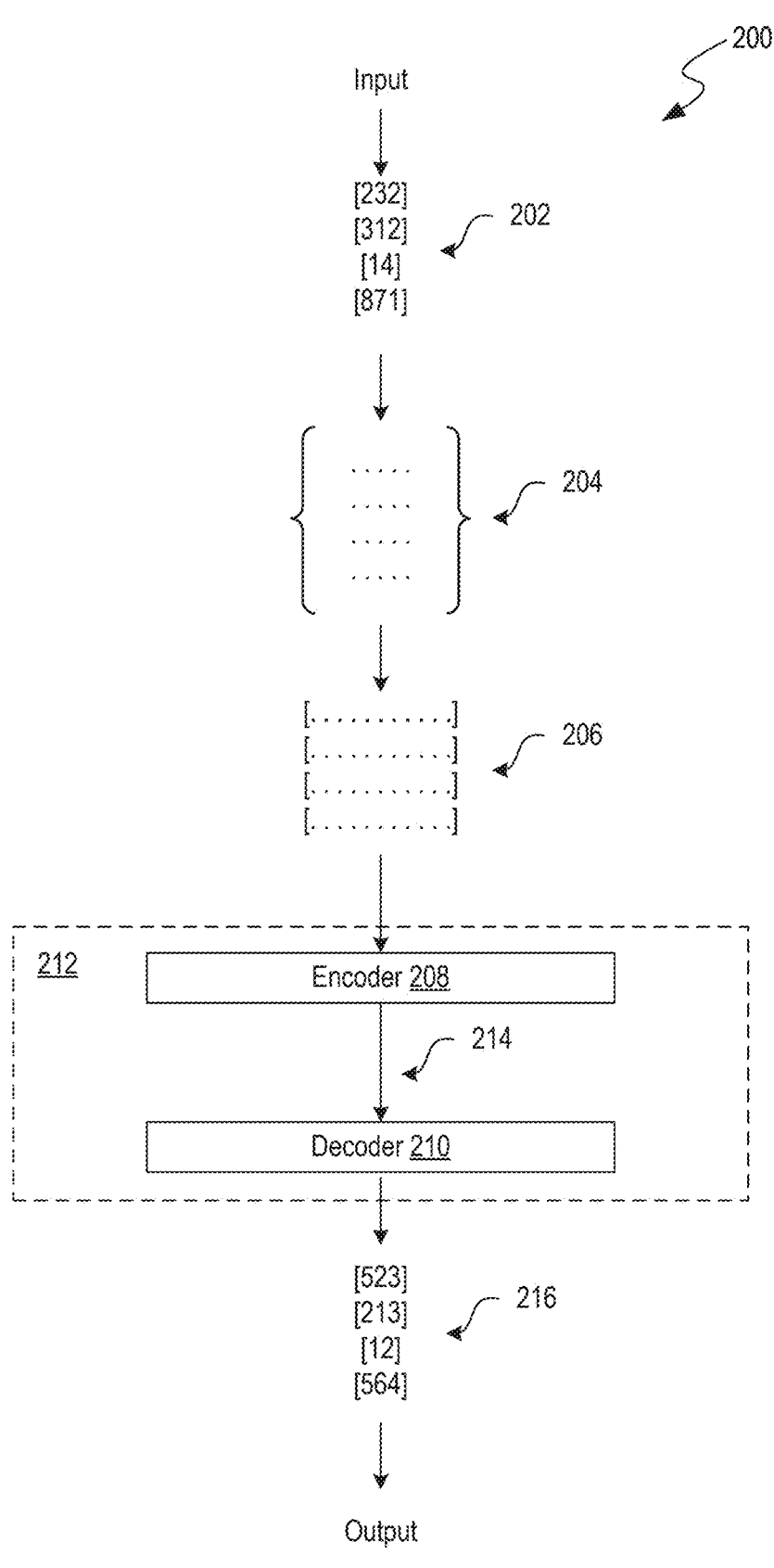
FIG. 2 is a block diagram of a transformer neural network that may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on input formats other than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use autoregression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
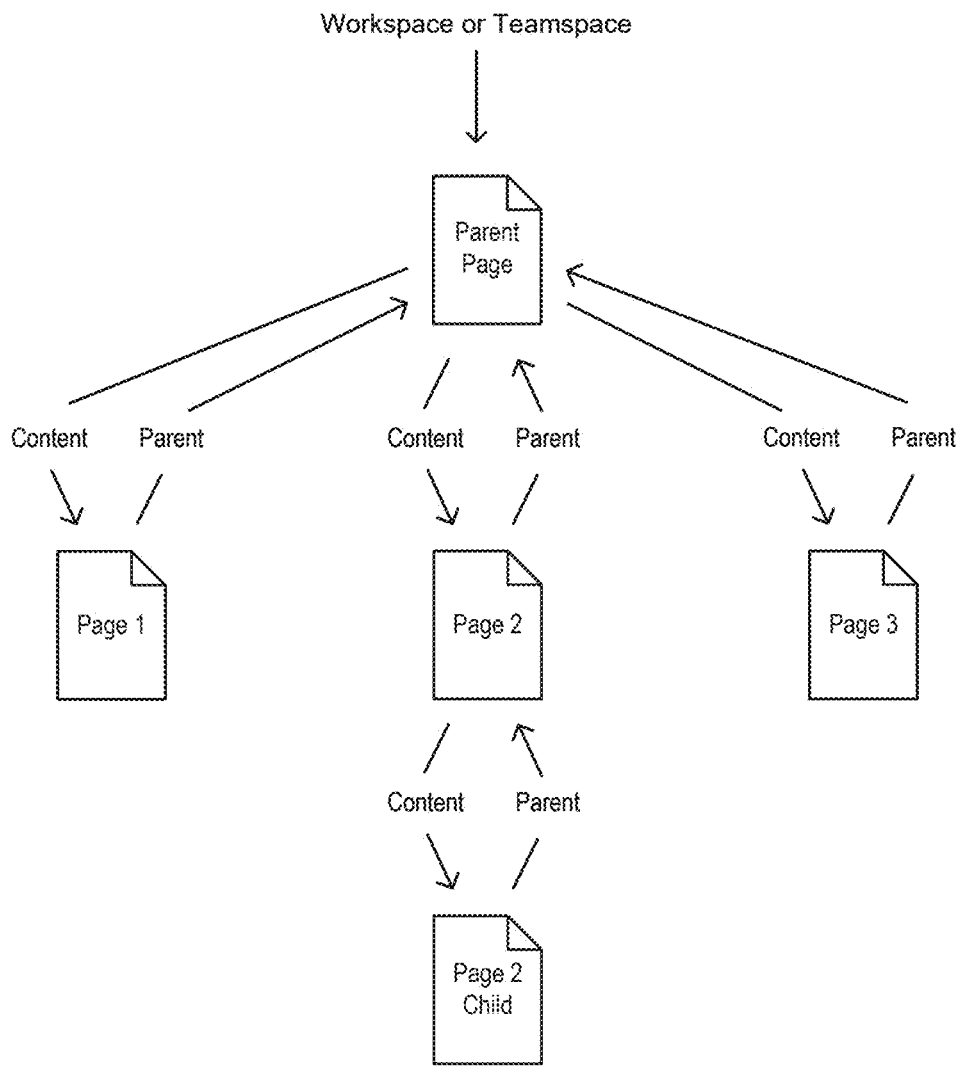
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the Internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Differing Internal and External Hierarchies

Figure 4:
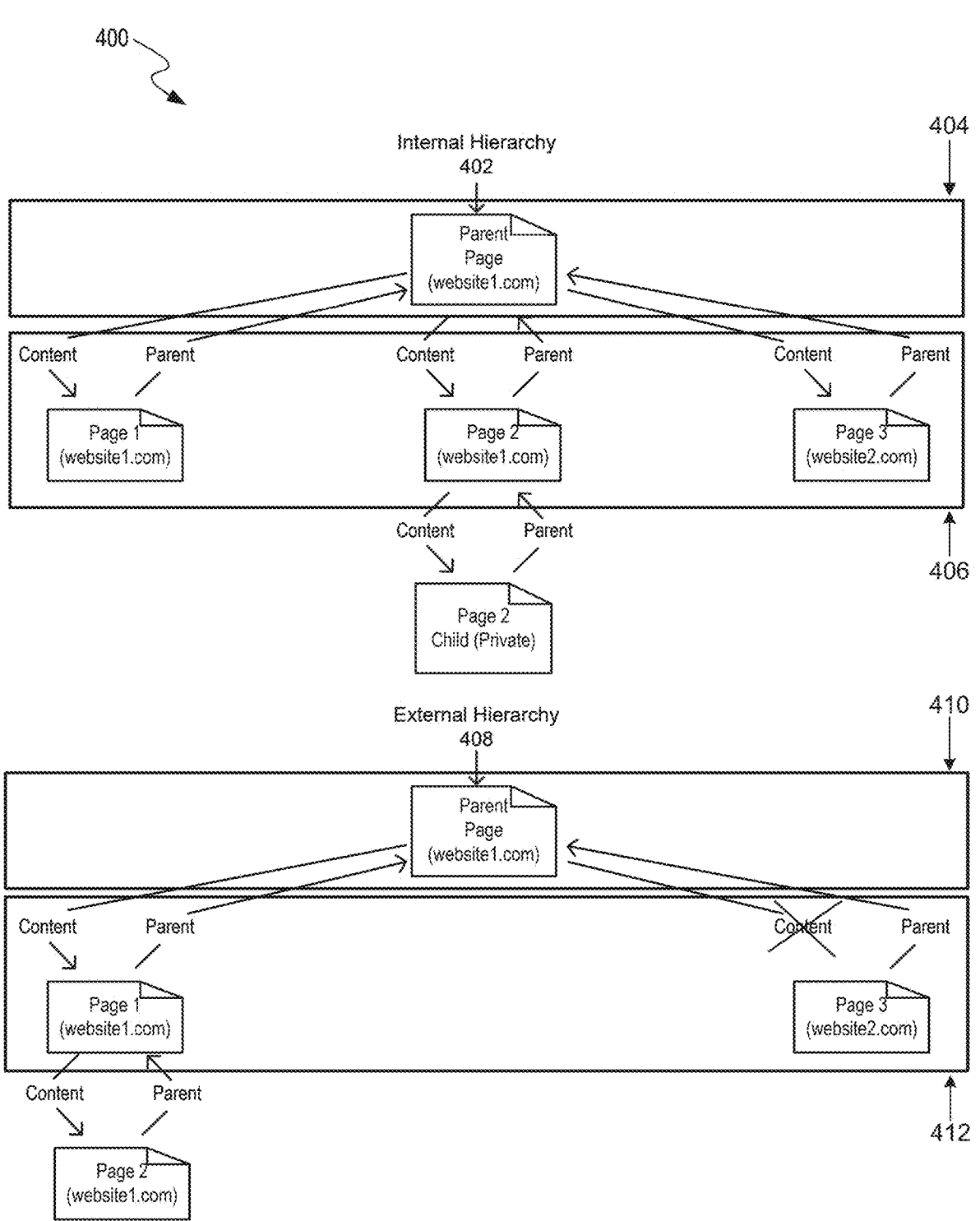
FIG. 4 is a block diagram illustrating an example hierarchy system with an internal and external hierarchy of pages which share pages but differ from one another overall.

FIG. 4 is a block diagram illustrating an example hierarchy system 400 with an internal and external hierarchy of pages which share pages but differ from one another overall. The foundation of the hierarchy system 400 is an internal hierarchy of pages, referred to simply as the internal hierarchy 402. In some embodiments, this internal hierarchy 402 includes an internal top level 404 and an internal lower level 406. The internal top level 404 includes one parent page; this page may then have one or more child pages, sometimes called subpages, which are included in the internal lower level 406. The parent-child relationship between the parent page and its one or more subpages is the same as described in relation to FIG. 3.

In some embodiments, each page in the internal hierarchy 402 has associated access permissions, which operate as described in relation to FIG. 3. For example, some pages in the internal hierarchy 402 may have access permissions designating them as publicly accessible while other pages may simultaneously be designated as private and therefore only accessible by members of the organization managing the hierarchy system 400 or a subset of those members. Such an embodiment is depicted in FIG. 4. The parent page of the internal hierarchy 402, as well as several of its subpages, are designated as being publicly accessible at a specified domain (i.e., website1.com or website2.com), while the page labeled "Page 2 Child" is designated as "Private," as its access permissions do not permit access by public users.

In some embodiments, when access permissions designate a certain page in the internal hierarchy 402 as public, it is published to the external hierarchy 408. A public domain name is associated with the page that may differ from a domain name associated with the page while the page was in the internal hierarchy 402 but not yet published to the external hierarchy 408. The external hierarchy 408 includes an external top level 410 and an external lower level 412. Analogously to the internal hierarchy 402, the external top level 410 includes only one parent page, which may have one or more child pages/subpages included in the external lower level 412. However, the external top level 410 and external lower level 412 need not contain the same pages as the corresponding internal top level 404 and lower level 406. In fact, the external hierarchy 408 can differ from the internal hierarchy 402 in arbitrarily many ways; the external hierarchy 408 need not include every page from the internal hierarchy 402, and the pages that are included need not have the same parent-child relationships as the same pages have in the internal hierarchy 402. For example, as depicted in FIG. 4, "Page 2 Child" is not included in the external hierarchy 408 because its access permissions designate it as a private page. Additionally, "Page 2" is a child of "Page 1" in the external hierarchy 408, despite being a sibling of "Page 1" in the internal hierarchy 402. In other embodiments, a child page in the internal hierarchy 402 may be published as the parent page in the external hierarchy 408 and any of that page's ancestors will not be included in the external hierarchy.

Furthermore, in some embodiments, not all pages published to the external hierarchy 408 will have the same associated domain and any subpages with domains that do not match the parent page will not be publicly accessible from the parent page in the external hierarchy 408. For example, as depicted in FIG. 4, the parent page is published to website1.com, while "Page 3" is published to website2.com, resulting in the content of "Page 3" not being accessible from the parent page. However, in such embodiments, private users who have access to the pages in the internal hierarchy 402 will still be able to access "Page 3" from the parent page within the internal hierarchy 402, as the internal hierarchy 402 is organized independently of the public domains at which a page can be accessed. In other embodiments, pages published to a different domain than the parent page are accessible via a hyperlink which takes a user from the domain of the parent page to the domain of the subpage (e.g., from website1.com to website2.com).

FIG. 5 is a flow diagram illustrating an example method 500 of publishing a page from an internal hierarchy 402 to a differing external hierarchy 408. In step 502, an internal hierarchy 402 of pages is generated. In some embodiments, this internal hierarchy 402 includes an internal top level 404 with one parent page and an internal lower level 406 with one or more subpages, as described in relation to FIG. 4. Subsequently, in step 504, access permissions are associated with a page in the internal hierarchy 402 in order to permit access to said page only to a restricted group of users. For example, the restricted group of users may be as broad as all members of an organization or as narrow as a single user. Access permissions can be associated with a page in different ways. For example, a child page may inherit access permissions from its parent page or be modified directly by a user.

In step 506, an indication designating a page as publicly accessible, such as a signal that a user changed an access permission associated with the page to permit public access, is received. This indication signals that the page in question is to be published to the World Wide Web such that anyone can access the page, not just those who have access to the internal hierarchy 402. As such, the page needs to have an associated domain. Therefore, in step 508, an indication is received designating a specific domain name associated with the page. This domain name (e.g., website1.com) indicates the domain to which the page will be published and is the domain name which users of the World Wide Web can navigate to in order to access the page.

Subsequently, in step 510, an external hierarchy 408 of pages is created which differs from the internal hierarchy 402. The hierarchies may differ in one or more ways including, for example, having different parent-child relationships between pages or publishing fewer pages to the external hierarchy 408 than are included in the internal hierarchy 402. Creating an external hierarchy 408 that is different from the internal hierarchy 402 allows for pages to be organized in the most logical and convenient way for the private users who have access to the internal hierarchy 402 and the public users of the external hierarchy 408, even if those organizations differ from one another. For example, users of the internal hierarchy 402 may all belong to a certain organization and wish to associate a page with the parent page of the internal hierarchy 402 that is relevant to the organization but not members of the public. In such an example, the internal hierarchy 402 could include the page in the appropriate level but the same page could be excluded from the external hierarchy 408 entirely, so as not to distract members of the public with extraneous information or reveal information that was meant to be confidential within the organization.

In step 512, the page which has been designated as publicly accessible and designated a domain name is published to the external hierarchy 408. Once the page is published, the page is publicly accessible at its designated domain name. In some embodiments, the page will be added to the external lower level 412 and thus be a subpage of the external hierarchy 408 parent page, but nevertheless be associated with a different domain name than the parent page. In such embodiments, the content of the newly published subpage may still be accessible from the parent page via a hyperlink which takes a user from the domain of the parent page to the domain of the subpage (e.g., from website1.com to website2.com). Alternatively, the subpage may not be accessible from the parent page and a user wishing to view the subpage will have to navigate to its domain directly.

In some embodiments, a date and time are associated with a page once it is published to the external hierarchy 408. Upon occurrence of this date and time, the page is removed from the external hierarchy 408 and is no longer publicly accessible but will remain accessible in the internal hierarchy 402. Establishing a date and time at which a page is automatically removed from the external hierarchy 408 allows the duration of public access to be automatically controlled.

Specific Page Features

Figure 6:
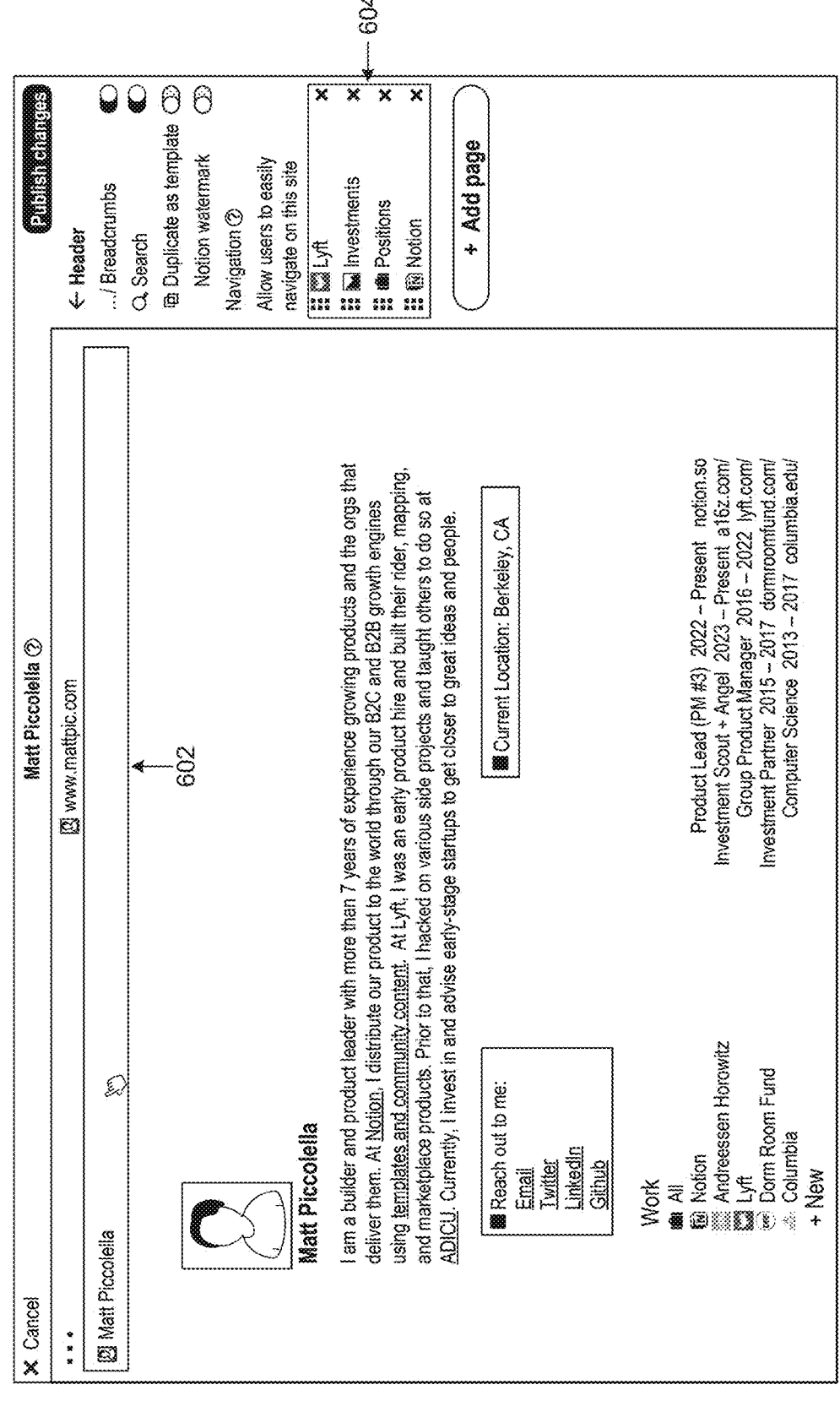
FIG. 6 illustrates an example published page including a customizable header bar.

FIG. 6 illustrates an example published page 600 including a customizable header bar 602. In some embodiments, the header bar 602 allows a user of the page to search for content on the page or any subpages that are children of the page in the external hierarchy 408. This search method allows users to extract relevant information from a page and all its children at once while not receiving extraneous results from unrelated pages in the external hierarchy 408. In embodiments where the page has children 604, the header bar 602 may also be customized to include a link to one or more of the page's children 604. In such embodiments, the link for each child 604 chosen to be linked in the header bar 602 may be an icon unique to each child 604, as shown next to the title of each child 604 page in FIG. 6.

In embodiments where the page is a child page, the header bar 602 can be customized to include a link to the one or more parent pages of the child page and to display breadcrumbs which indicate the layers of pages above the child page in the external hierarchy 408. These features allow users of the page to see at a glance where the page is located in the external hierarchy 408 and to access pages higher in the external hierarchy 408 when necessary, in order to view or search for more or different information. In some embodiments, the header bar 602 and its associated customizations may be saved as a template to be used for other pages, allowing the same customizations to be replicated on a different page with a single selection of the saved template.

FIG. 7 illustrates an example management portal 700 for displaying and modifying the settings of pages managed by a user. In some embodiments, after a page is published to the external hierarchy 408, it is added to a management portal 700 where information about all pages a user has published is displayed. The information displayed about each page may include, for example, the domain name, publication date, or access permissions associated with each page. In some embodiments, the management portal 700 also allows a user to change these properties for each page. For example, the management portal 700 may allow a user to change the domain to which a page in the management portal 700 is published.

Figure 8:
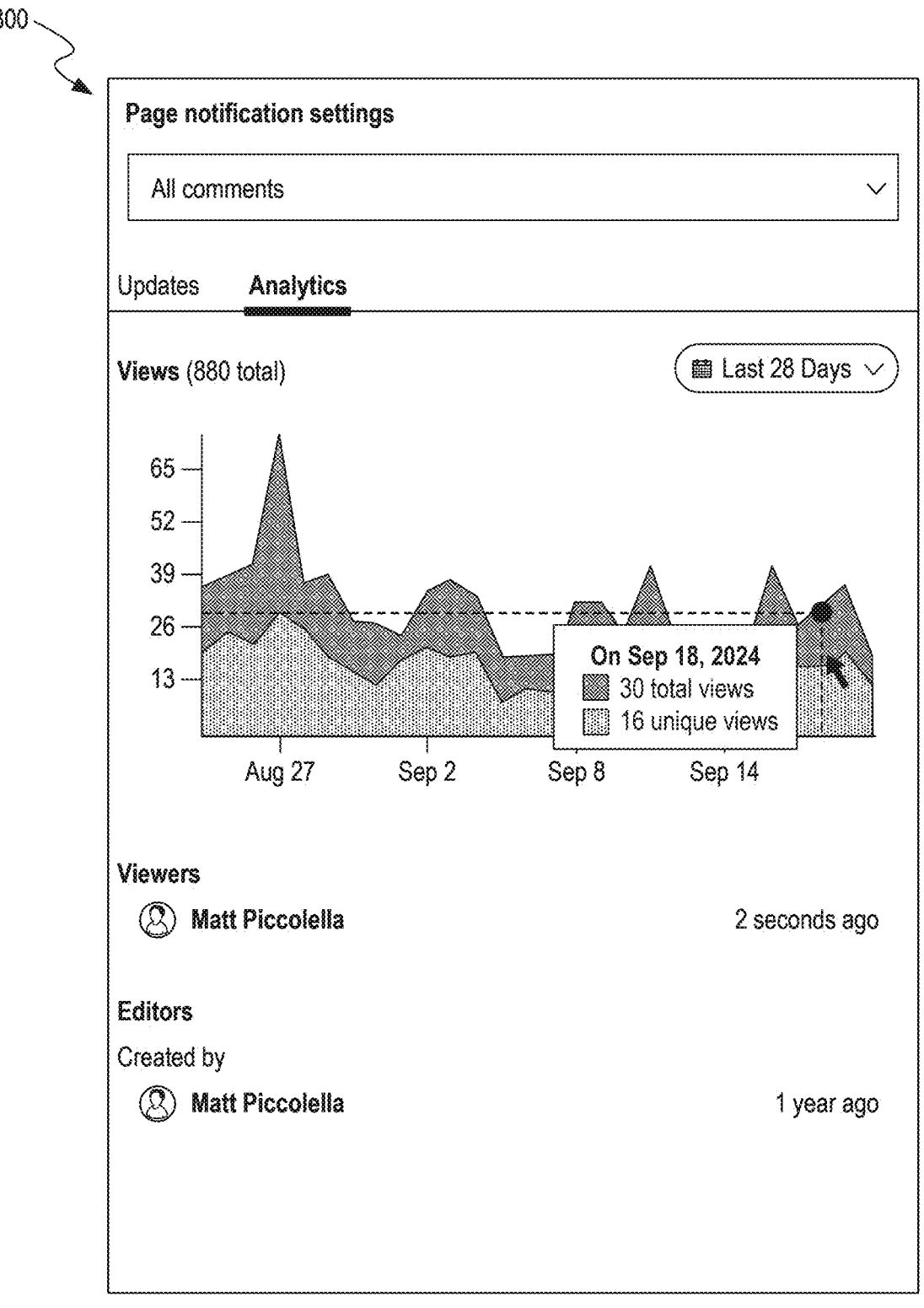
FIG. 8 is an example analytics panel for viewing statistics pertaining user interactions with a page.

FIG. 8 is an example analytics panel 800 for viewing statistics pertaining to user interactions with a page. In some embodiments, the analytics panel 800 is configured to show usage statistics for a page, such as the number of times a page was viewed or edited within a specified date range. In other embodiments, the analytics panel 800 is also config-ured to divide up statistical reports according to the type of user. For example, the analytics panel 800 may indicate how many views from a specific day came from unique users, as shown in FIG. 8, or indicate whether each view was from a public or private user. In such embodiments, a user is categorized as public or private based on whether the user accessed the page through the external hierarchy 408 or internal hierarchy 402, respectively.

In some embodiments, the analytics panel 800 also records the name of a user interacting with the page, when such a name is available. The name of a user will typically be available for private users, who are known individuals accessing the page through an internal hierarchy 402 and, in some embodiments, at the direction of an organization. However, identifying information about public users access-ing the page through the external hierarchy 408 is less likely to be available as anyone with Internet access can access the page through the external hierarchy 408. When identifying information about a user is unavailable, the analytics panel 800 may, for example, denote that an anonymous user visited the site or record a generated name to associate with the user.

Figure 9:
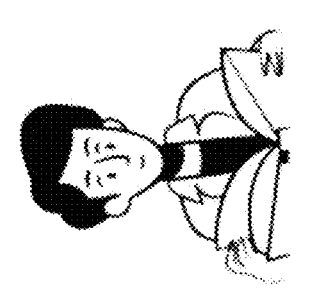
FIG. 9 is an example smart unfurl image associated with a link to a page.

FIG. 9 is an example smart unfurl image 900 associated with a link to a page. When an Internet user wants to share a page with another individual, it is common for the user to copy a hyperlink, which is a uniform resource locator (URL) that uniquely identifies a specified page on a network, such as the World Wide Web. When hyperlinks are shared, an associated unfurl image representing the content of the page identified by the hyperlink is often shared alongside the hyperlink and appears when the hyperlink is received. Unfurl images are traditionally created by sharing metadata about a page with another page or service that receives the hyperlink to the page. This metadata can indicate, for example, information about the page or images representing the page. The receiving page or service processes this metadata to display the relevant information and/or images alongside the received hyperlink.

By contrast, a smart unfurl image 900 is automatically generated and thematically resembles the content of the page. A smart unfurl image 900 can thematically represent a page by including content from the page itself or newly generated content, depending on which option would most adequately represent the page as a whole. For example, as depicted in FIG. 9, the smart unfurl image 900 represents an unfurl image for a page containing information about the functionality of Notion by displaying text capturing the important features of Notion and images in the artistic style of images used on Notion pages along with the hyperlink identifying the page. The text and images in the smart unfurl image 900 are not from the page itself, but instead are generated to represent the totality of the content contained on the page.

In some embodiments, the smart unfurl image 900 is generated when an indication that a link to a page in the external hierarchy 408 is going to be shared is received. When this indication is received, the current content of the page is automatically analyzed and images and/or text summarizing this content are generated to be used in the composition of the unfurl image. For example, the repre-sentative images and/or text may be generated using an AI tool 104 as described in relation to FIG. 1, which is configured to analyze the content of the page for relevant features to capture in the unfurl image. In some embodi-ments, the automatically generated smart unfurl image 900 is overridden by a user uploading an image of the user's choice to serve as the smart unfurl image 900 instead.

AI Search and Editing Features

The systems and methods disclosed herein also provide for the addition of an artificial intelligence (AI) search feature to a page published in the external hierarchy 408. Information contained on pages in the external hierarchy 408 can be searched using natural language via a search interface, which receives a natural language search query as input and provides that input to an AI tool 104, which receives and processes the natural language search query in turn. A response to the natural language search query is then obtained from the AI tool 104 which is responsive to the query.

Current AI search features on websites are rapidly becom-ing more proficient at comprehending and responding to natural language search queries but often have delayed response times because the AI tools used will search large swathes of the World Wide Web in order to find relevant information to use in generating responses. Furthermore, AI tools that are unbounded or otherwise inadequately restricted in the information they search may report private or extraneous information in response to a natural language search query. This results in responses that are inaccurate and/or inappropriate for the public user inputting the natural language search query to receive.

The present technology improves on the present state of AI search features on websites by limiting the scope of the information which the AI tool 104 uses to respond to the natural language search query to information contained on pages in the external hierarchy 408 which the page where the search is being accessed belongs to. This limitation ensures that the AI tool 104 will only rely on information that has been made public by the publishers of the external hierarchy 408 to generate its responses, avoiding the privacy concerns of other AI search features. Furthermore, because the AI tool 104 is limited to searching information in the external hierarchy 408, its search will only involve processing a small amount of data and its responses will only include information related to the page being searched. This limited search scope therefore allows accurate and relevant responses to a user's natural language search query to be delivered quickly.

FIG. 10 is a flow diagram illustrating an example method of searching 1000 for information contained on pages in an external hierarchy 408 using an AI tool 104. In step 1002, indications are received designating a page as publicly accessible and designating a domain associated with the page. Subsequently in step 1004, an external hierarchy 408 of pages is created including an external top level page and external lower level page. As described in relation to FIG. 4, the external top level 410 includes only one parent page, meaning the external top level page serves as the parent to the external lower level page, which is included in the external lower level 412. The external lower level page and its content are therefore accessible from the external top level page.

Subsequently in step 1006, the page designated as pub-licly accessible is added to the external hierarchy 408. In step 1008, the page is then published to the domain that has been associated with the page. Steps 1006 and 1008 result in the page being publicly accessible by any Internet user who navigates to the page's specified domain and associate the page with at least one other page in the external hierarchy 408. In some embodiments, the page will be added to the external lower level 412 and thus be a subpage of the external hierarchy's 408 parent page but nevertheless be associated with a different domain name than the parent page. In such embodiments, the content of the newly published subpage may still be accessible from the parent page via a hyperlink which takes a user from the domain of the parent page to the domain of the subpage (e.g., from website1.com to website2.com). Alternatively, the subpage may not be accessible from the parent page and a user wishing to view the subpage will have to navigate to its domain directly.

Subsequently in step 1010, a search interface is provided to the published page. In some embodiments, this search interface will appear as part of a customizable header bar 602, as depicted in FIG. 6. The search interface is configured to receive text input from a user of the website. Accordingly, in step 1012, a natural language search query is received as input at the search interface. Natural language search queries are search queries phrased in the pattern of natural human speech, rather than as a Boolean or keyword search designed to be processed by a computerized search engine. For example, a user visiting the page depicted in FIG. 6 may be interested in Matt Piccolella's employment history. The user could input "Matt Piccolella employment history" as a keyword search, or "What jobs did Matt have previously?" as a natural language search query. The search interface's ability to receive natural language search queries allows users to phrase their queries in ways that correspond more closely to the way that a human user conceives of queries naturally.

Subsequently in step 1014, the natural language search query is provided to an AI tool 104, which receives and processes the query. In some embodiments, the AI tool 104 is a language model as described in relation to FIG. 2, allowing the AI tool 104 to process the natural language search query and provide a response that is relevant to the intended meaning of the query. As described above, traditional language models and other traditional tools may have their effectiveness limited by searching an unbounded or otherwise inadequately restricted space of information in order to respond to a query. Thus, in step 1016, the scope of information the AI tool 104 uses to respond to the natural language search query is limited to information contained on pages in the external hierarchy 408. This limitation ensures that the AI tool 104 will only rely on information that is intended for public consumption in generating responses, as all pages in the external hierarchy 408 have been designated publicly accessible. Furthermore, because the AI tool 104 is limited to searching information in the external hierarchy 408, its search will only involve processing a relatively small amount of data from pages that are related to one another, ensuring the AI tool's 104 responses will be fast and only include relevant information.

In step 1018, a response to the natural language search query is obtained from the AI tool 104. For example, the response may be presented as a link to a relevant portion of a page in the external hierarchy 408, or as a chat-like output addressing the query in natural language. In some embodiments, more than one response will be obtained and displayed to the user, allowing the user to view several different pieces of information relevant to the user's natural language search query.

In some embodiments, an internal hierarchy 402 is also generated alongside the external hierarchy 408, the two hierarchies having the same relationship as described in relation to FIG. 4. In such embodiments, the external lower level 412 and internal lower level 406 differ from one another on account of access permissions indicating that a page in the internal lower level 406 is not publicly accessible and access is restricted to a certain group of users. The AI tool 104 will therefore be unable to process information on the restricted page in generating its responses to natural language search queries as the AI tool 104 only processes information on pages in the external hierarchy 408. In this way, pages can be associated with one another in the internal hierarchy 402 without revealing potentially confidential or extraneous information through the AI tool's 104 response to a search of a page included in the external hierarchy 408.

In some embodiments, before the natural language search query is processed by the AI tool 104, the semantic meaning of the natural language search query is extracted and information related to the semantic meaning from a pre-compiled database of information is received. For example, the semantic meaning may be extracted using one or more of the text processing techniques described in relation to FIG. 2 above. In some embodiments, the pre-compiled database is a compilation of the information contained on pages in the external hierarchy 408 or a compilation of related information not included on those pages created by the publishers of the pages in the external hierarchy 408.

In such embodiments, the natural language search query is subsequently augmented with the information received from the pre-compiled database. For example, this augmentation may occur using a retrieval-augmented generation (RAG) framework which fetches information from the pre-compiled database and then vectorizes that information, along with the natural language search query itself. The two vectors are then integrated such that, when the vector is provided to the AI tool 104, the AI tool 104 is more precisely directed to generating a relevant response to the natural language search query. The augmented natural language search query is then provided to the AI tool 104.

In some embodiments, an example search query is displayed at the search interface. This example search query is based on information contained on pages in the external hierarchy 408 and represents the types of natural language search queries a user can input into the search interface in order to receive a response from the AI tool 104. For example, a record may be maintained of queries previously received on pages in the external hierarchy 408 and the most popular query may be displayed as an example. In this way, users receive an indication of the information available in the external hierarchy 408 and an indication of which information is most pertinent to previous users. A user then selects the example search query in order to indicate that the user would like an answer to that same query, after which the example search query is provided to the AI tool 104 for processing as described above.

In some embodiments, after a user receives a response to a natural language search query, the user is prompted to submit feedback on the quality of the response. This feedback is then received and provided to the AI tool 104 so that the AI tool 104 can incorporate the feedback and improve its future responses to natural language search queries. For example, the feedback may be used to adjust the weight of different parameters in the training of the AI tool 104, helping the AI tool 104 to prioritize information that users find most pertinent.

Figure 11:
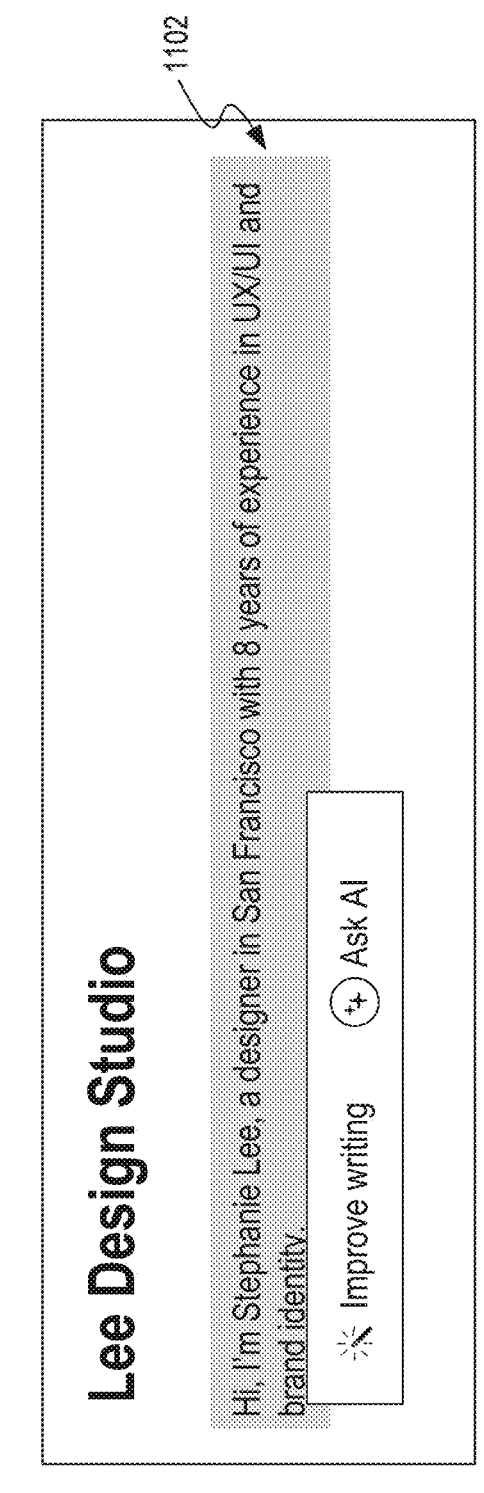
FIG. 11 illustrates a method of using an AI tool to edit highlighted text on a page.

FIG. 11 illustrates a method 1100 of using an AI tool 104 to edit highlighted text on a page. First, the highlighted text 1102 is highlighted by a user and provided to the AI tool 104, which is configured to receive and process the highlighted text 1102. For example, the AI tool 104 may process the highlighted text 1102 using the same techniques as it uses to process a natural language search query, described above in relation to FIG. 10. Next, the options to improve the highlighted text 1102 and receive an AI-generated suggestion for an improved version of the highlighted text 1102 are displayed to the user. Upon selection of the option to improve the highlighted text 1102, the AI tool 104 is configured to replace the highlighted text 1102 with an improved version of that text. For example, the improved text would have the same semantic meaning as the original highlighted text 1102 but be more concise and/or easier to comprehend by a reader. Upon selection of the option to receive a suggestion, the AI tool 104 is configured to provide a suggestion for improving the highlighted text 1102 to the user but not to replace the text automatically.

Computer System

Figure 12:
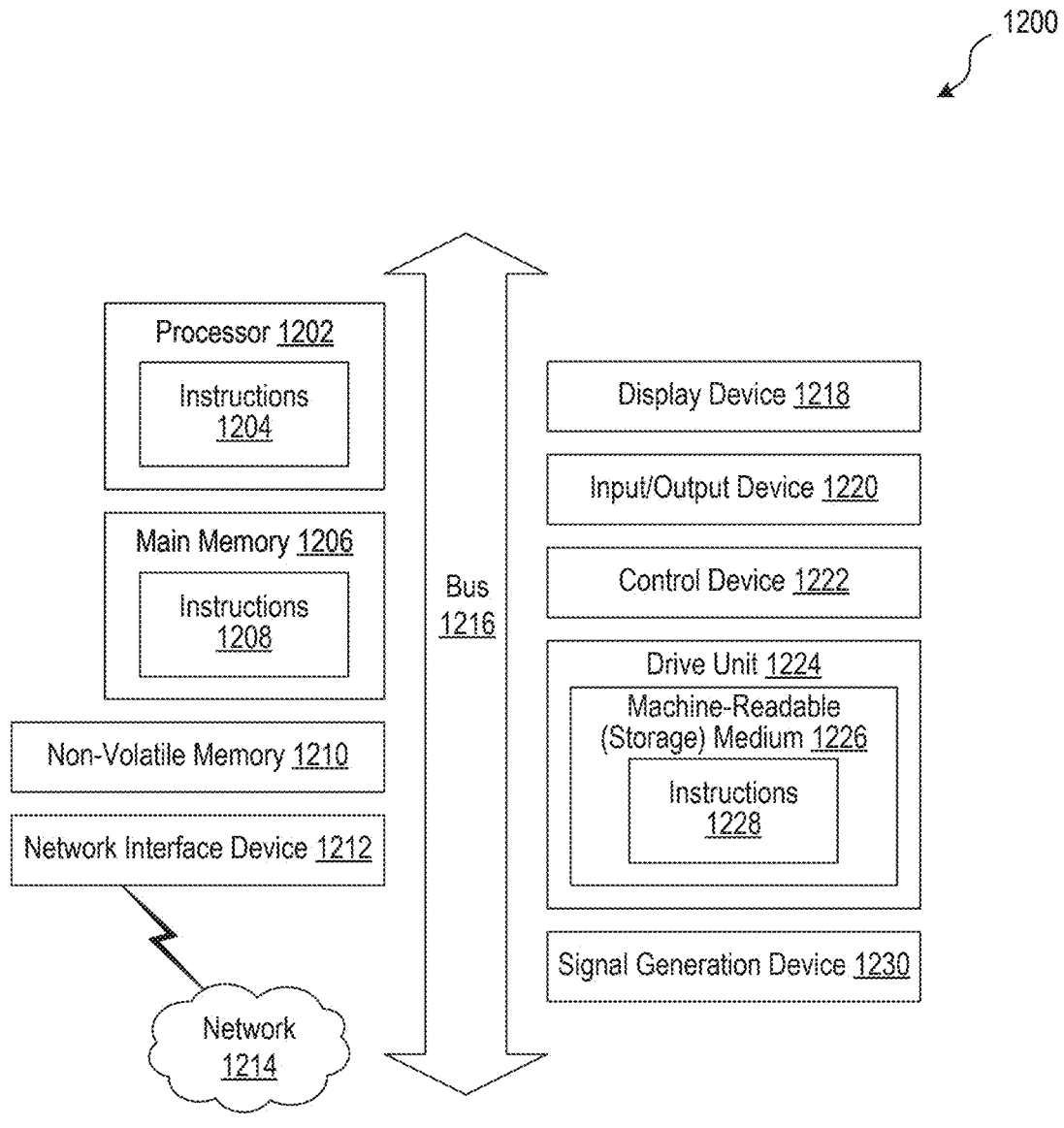
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computer system 1200 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1200. In some implementations, the computer system 1200 can be an embedded computer system, a system-on-chip (SOC), a single-board computer (SBC) system, or a distributed system such as a mesh of computer systems or include one or more cloud components in one or more networks. Where appropriate, one or more computer systems 1200 can perform operations in real time, near real time, or in batch mode.

The network interface device 1212 enables the computer system 1200 to mediate data in a network 1214 with an entity that is external to the computer system 1200 through any communication protocol supported by the computer system 1200 and the external entity. Examples of the network interface device 1212 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computer system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computer system 1200 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A non-transitory, computer-readable storage medium comprising instructions recorded thereon, wherein the instructions, when executed by at least one data processor of a system, cause the system to:

generate an internal hierarchy of pages, wherein the internal hierarchy includes an internal top level page and an internal lower level page, wherein the internal lower level page is accessible from the internal top level page, a parent page, wherein the parent page is included as a top level page in the internal hierarchy, and a subpage, wherein the subpage is included as a lower level page in the internal hierarchy;

associate access permissions with a page in the internal hierarchy in order to permit access to a restricted group of users;

receive an indication designating that the parent page is publicly accessible and an indication designating a first domain name associated with the parent page;

upon receiving the indications designating that the parent page is publicly accessible and designating the first domain name, create an external hierarchy of pages that differs from the internal hierarchy including an external top level page and an external lower level page, wherein setting the access permissions associated with the page enables the external hierarchy to differ from the internal hierarchy, wherein the external lower level page is accessible from the external top level page, wherein the parent page is included as an external top level page in the external hierarchy;

publishing the parent page to the external hierarchy at the first domain name;

receive an indication designating that the subpage is publicly accessible and an indication designating a second domain name associated with the subpage;

upon receiving the indications designating that the subpage is publicly accessible and designating the second domain name, add the subpage to the external hierarchy of pages at the second domain name;

when the first domain name and the second domain name do not match, prevent access to the subpage from the parent page in the external hierarchy while enabling access to the subpage from the parent page in the internal hierarchy, thereby presenting the external hierarchy as different from the internal hierarchy; and when the first domain name and the second domain name match, enable access to the subpage from the parent page in both the internal and external hierarchies.

2. The non-transitory, computer-readable storage medium of claim 1, further comprising instructions to:

provide a header bar associated with the parent page, wherein the header bar is customized to include a search interface, wherein the search interface allows a user to search for content on the parent page or a subpage, wherein the header bar is customized to include a link to a subpage, and wherein the header bar is saved as a template to be used for another page in the external hierarchy; and provide a header bar associated with the subpage, wherein the header bar is customized to include a search interface, wherein the search interface allows a user to search for content on the subpage, wherein the header bar is customized to include a link to the parent page or a different subpage, wherein the header bar is customized to display breadcrumbs indicating a location of the subpage in the external hierarchy, and wherein the header bar is saved as a template to be used for another page in the external hierarchy.

3. The non-transitory, computer-readable storage medium of claim 1, further comprising instructions to:

add a page in the external hierarchy to a management portal, wherein information about a page previously added to the management portal is displayed, wherein a domain name associated with the page is displayed, wherein the parent page and the first domain name associated with the parent page is displayed, and wherein the domain name associated with the page and whether the page is publicly accessible is changed.

4. The non-transitory, computer-readable storage medium of claim 1, further comprising instructions to:

provide an analytics panel associated with a page in the external hierarchy, wherein the analytics panel can display statistics pertaining to a user interaction with the page;

categorize the user interaction as originating from a public user accessing the page through the external hierarchy, or a private user accessing the page through the internal hierarchy; and record a name associated with the user interaction, when the user interaction is categorized as originating from a private user.

5. The non-transitory, computer-readable storage medium of claim 1, further comprising instructions to:

receive an indication that a link to a page in the external hierarchy is going to be shared; and provide, based on content included in the page, a smart unfurl image associated with the link to the page, wherein the smart unfurl image thematically resembles the content of the page, and wherein the smart unfurl image is edited by a user or replaced with a preexisting image.

6. The non-transitory, computer-readable storage medium of claim 1, further comprising instructions to:

provide text on a page in the internal hierarchy which is highlighted by a user to an artificial intelligence (AI) tool, wherein the AI tool is configured to receive and process the highlighted text, wherein the AI tool is configured to, upon receiving an improvement request from the user, replace the highlighted text with an improved version of the text, and wherein the AI tool is configured to, upon receiving a suggestion request from the user, provide a suggestion for an improved version of the text.

7. The non-transitory, computer-readable storage medium of claim 1, further comprising instructions to:

associate a date and time with a page in the external hierarchy; and upon occurrence of the date and time, remove the page from the external hierarchy.

8. A method comprising:

generating an internal hierarchy of pages, wherein the internal hierarchy includes an internal top level page and an internal lower level page, wherein the internal lower level page is accessible from the internal top level page, a parent page, wherein the parent page is included as a top level page in the internal hierarchy, and a subpage, wherein the subpage is included as a lower level page in the internal hierarchy;

associating access permissions with a page in the internal hierarchy in order to permit access to a restricted group of users;

receiving an indication designating that the parent page within the internal hierarchy is publicly accessible and an indication designating a first domain name associated with the parent page;

creating, upon receiving the indications designating that the parent page is publicly accessible and designating the first domain name, an external hierarchy of pages that differs from the internal hierarchy, wherein setting the access permissions associated with the page enables the external hierarchy to differ from the internal hierarchy, wherein the external hierarchy includes an external top level page and an external lower level page, wherein the external lower level page is accessible from the external top level page, wherein the parent page is included as an external top level page in the external hierarchy; and publishing the parent page to the external hierarchy at the first domain name;

receiving an indication designating that the subpage is publicly accessible and an indication designating a second domain name associated with the subpage;

upon receiving the indications designating that the subpage is publicly accessible and designating the second domain name, adding the subpage to the external hierarchy of pages at the second domain name;

when the first domain name and the second domain name do not match, preventing access to the subpage from the parent page in the external hierarchy while enabling access to the subpage from the parent page in the internal hierarchy, thereby presenting the external hierarchy as different from the internal hierarchy; and when the first domain name and the second domain name match, enabling access to the subpage from the parent page in both the internal and external hierarchies.

9. The method of claim 8, further comprising:

associating the page in the internal hierarchy with the internal lower level; and associating an external lower level page with the external lower level, wherein the external lower level page is different from the page associated with the internal lower level.

10. The method of claim 8, further comprising:

providing a header bar associated with a page associated with the external top level, wherein the header bar is customized to include a search interface, wherein the search interface allows a user to search for content on the page or a subpage associated with the external lower level, wherein the header bar is customized to include a link to the subpage, and wherein the header bar is saved as a template to be used for another page in the external hierarchy; and providing a header bar associated with the subpage, wherein the header bar is customized to include a search interface, wherein the search interface allows a user to search for content on the subpage, wherein the header bar is customized to include a link to the page associated with the external top level or a different subpage associated with the external lower level, wherein the header bar is customized to display breadcrumbs indicating a location of the subpage in the external hierarchy, and wherein the header bar is saved as a template to be used for another page in the external hierarchy.

11. The method of claim 8, further comprising:

adding a page in the external hierarchy to a management portal, wherein information about a page previously added to the management portal is displayed, wherein a domain name associated with the page is displayed, wherein the page and the domain name associated with the page is displayed, and wherein the domain name associated with the page and whether the page is publicly accessible is changed.

12. The method of claim 8, further comprising:

providing an analytics panel associated with a page in the external hierarchy, wherein the analytics panel can display statistics pertaining to a user interaction with the page;

categorizing the user interaction as originating from a public user accessing the page through the external hierarchy, or a private user accessing the page through the internal hierarchy; and recording a name associated with the user interaction, when the user interaction is categorized as originating from a private user.

13. The method of claim 8, further comprising:

receiving an indication that a link to a page in the external hierarchy is going to be shared; and providing, based on content included on the page, a smart unfurl image associated with the link to the page, wherein the smart unfurl image thematically resembles the content of the page, and wherein the smart unfurl image is edited by a user or replaced with a preexisting image.

14. The method of claim 8, further comprising:

providing text on a page in the internal hierarchy which is highlighted by a user to an artificial intelligence (AI) tool, wherein the AI tool is configured to receive and process the highlighted text, wherein the AI tool is configured to, upon receiving an improvement request from the user, replace the highlighted text with an improved version of the text, and wherein the AI tool is configured to, upon receiving a suggestion request from the user, provide a suggestion for an improved version of the text.

15. The method of claim 8, further comprising:

associating a date and time with a page in the external hierarchy; and upon occurrence of the date and time, removing the page from the external hierarchy.

16. A system comprising:

at least one hardware processor; and at least one non-transitory memory storing instructions, which, when executed by the at least one hardware processor, cause the system to:

generate an internal hierarchy of pages, wherein the internal hierarchy includes an internal top level page and an internal lower level page, wherein the internal lower level page is accessible from the internal top level page, a parent page, wherein the parent page is included as a top level page in the internal hierarchy, and a subpage, wherein the subpage is included as a lower level page in the internal hierarchy;

associate access permissions with a page in the internal hierarchy in order to permit access to a restricted group of users;

receive an indication designating that the parent page within the internal hierarchy is publicly accessible and an indication designating a first domain name associated with the parent page;

create, upon receiving the indications designating that the parent page is publicly accessible and designating the first domain name, an external hierarchy of pages that differs from the internal hierarchy, wherein setting the access permissions associated with the page enables the external hierarchy to differ from the internal hierarchy, wherein the external hierarchy includes an external top level page and an external lower level page, wherein the external lower level page is accessible from the external top level page, wherein the parent page is included as an external top level page in the external hierarchy;

publish the parent page to the external hierarchy at the first domain name;

receive an indication designating that the subpage is publicly accessible and an indication designating a second domain name associated with the subpage;

upon receiving the indications designating that the subpage is publicly accessible and designating the second domain name, add the subpage to the external hierarchy of pages at the second domain name;

when the first domain name and the second domain name do not match, prevent access to the subpage from the parent page in the external hierarchy while enabling access to the subpage from the parent page in the internal hierarchy, thereby presenting the external hierarchy as different from the internal hierarchy; and when the first domain name and the second domain name match, enable access to the subpage from the parent page in both the internal and external hierarchies.

17. The system of claim 16, further comprising instructions causing the system to:

associate the page in the internal hierarchy with the internal lower level; and associate an external lower level page with the external lower level, wherein the external lower level page is different from the page associated with the internal lower level.

18. The system of claim 16, further comprising instructions causing the system to:

provide a header bar associated with a page associated with the external top level, wherein the header bar is customized to include a search interface, wherein the search interface allows a user to search for content on the page or a subpage associated with the external lower level, wherein the header bar is customized to include a link to the subpage, and wherein the header bar is saved as a template to be used for another page in the external hierarchy; and provide a header bar associated with the subpage, wherein the header bar is customized to include a search interface, wherein the search interface allows a user to search for content on the subpage, wherein the header bar is customized to include a link to the page associated with the external top level or a different subpage associated with the external lower level, wherein the header bar is customized to display breadcrumbs indicating a location of the subpage in the external hierarchy, and wherein the header bar is saved as a template to be used for another page in the external hierarchy.

19. The system of claim 16, further comprising instructions causing the system to:

add a page in the external hierarchy to a management portal, wherein information about a page previously added to the management portal is displayed, wherein a domain name associated with the page is displayed, wherein the page and the domain name associated with the page is displayed, and wherein the domain name associated with the page and whether the page is publicly accessible is changed.

20. The system of claim 16, further comprising instructions causing the system to:

provide an analytics panel associated with a page in the external hierarchy, wherein the analytics panel can display statistics pertaining to a user interaction with the page;

categorize the user interaction as originating from a public user accessing the page through the external hierarchy or a private user accessing the page through the internal hierarchy; and record a name associated with the user interaction, when the user interaction is categorized as originating from a private user.

* * * * *